United States Patent [19]

Naimpally

[11] Patent Number: 5,309,235

[45] Date of Patent: May 3, 1994

[54] SYSTEM AND METHOD FOR TRANSMITTING DIGITAL DATA IN THE OVERSCAN PORTION OF A VIDEO SIGNAL

[75] Inventor: Saiprasad V. Naimpally, Langhorne, Pa.

[73] Assignee: Matsushita Electric Corporation of America, Secaucus, N.J.

[21] Appl. No.: 951,101

[22] Filed: Sep. 25, 1992

[51] Int. Cl.$^5$ .................. H04N 9/87; H04N 7/08
[52] U.S. Cl. .................... 348/476; 348/469
[58] Field of Search ............ 358/142, 147, 23, 22, 358/183, 12, 141; H04N 7/08, 7/87

[56] References Cited

U.S. PATENT DOCUMENTS

| | | | |
|---|---|---|---|
| 4,551,754 | 11/1985 | Meise | 358/147 |
| 4,727,361 | 2/1988 | Tokumitsu | 358/23 |
| 4,855,811 | 8/1989 | Isnardi | 358/12 |
| 4,864,403 | 9/1989 | Chao et al. | |
| 4,888,641 | 12/1989 | Isnardi et al. | |
| 4,939,515 | 7/1990 | Adelson | 341/51 |
| 5,134,464 | 7/1992 | Basile et al. | 358/12 |
| 5,148,275 | 9/1992 | Blatter | 358/147 |
| 5,196,921 | 5/1993 | Megeid | 358/147 |

FOREIGN PATENT DOCUMENTS 2244888  12/1991  United Kingdom .......... H04N 7/08

OTHER PUBLICATIONS

Mischa Schwartz, "Information Transmission, Modulation, and Noise", McGraw-Hill, pp. 224-235 (1980).
"EIEE Standard Dictionary of Electrical and Electronics Terms—Fourth Edition", *IEEE* p. 763 (1990).
Inoue et al, "Encoding and Decoding in the 6-MHz NTSC-Compatible Widescreen Television System," IEEE Transactions on Circuits and Systems for Video Technology, vol. 1, No. 1, Mar. 1991.
Proakis, "Digital Communications," McGraw Hill 1989, pp. 532-536.

*Primary Examiner*—James J. Groody
*Assistant Examiner*—Chris Grant
*Attorney, Agent, or Firm*—Ratner & Prestia

[57] ABSTRACT

A system and method for transmitting digital data in the horizontal overscan portion of a composite video signal is presented. A source supplies digital data which is encoded by a 32-state QAM encoder using a symbol clock having a frequency $4f_{sc}$, 4 times the color subcarrier frequency ($f_{sc}$), then the encoded data is quadrature amplitude modulated using a carrier signal with a frequency of $f_{sc}/2$. The modulated digital data replaces the video signal in the horizontal and vertical overscan portions of the baseband video signal. The video signal is received, the modulated digital data is extracted from the video signal, demodulated using QAM techniques, and decoded with a reconstructed version of the symbol clock.

11 Claims, 12 Drawing Sheets

SQUARE ROOT RAISED COSINE FILTER RESPONSE FREQUENCY

| Frequency | Amplitude Response |
|---|---|
| 0.3 fsc | 1.0 |
| 0.317 fsc | 0.992 |
| 0.333 fsc | 0.966 |
| 0.35 fsc | 0.924 |
| 0.367 fsc | 0.866 |
| 0.383 fsc | 0.793 |
| 0.4 fsc | 0.707 |
| 0.417 fsc | 0.609 |
| 0.433 fsc | 0.500 |
| 0.45 fsc | 0.383 |
| 0.467 fsc | 0.259 |
| 0.483 fsc | 0.130 |
| 0.5 fsc | 0.000 |

FIG. 11B

SYSTEM AND METHOD FOR TRANSMITTING DIGITAL DATA IN THE OVERSCAN PORTION OF A VIDEO SIGNAL

BACKGROUND OF THE INVENTION

A. Field of the Invention

The invention relates generally to the transmission of data within a video signal and, more particularly, it relates to the transmission of quadrature amplitude modulated digital data within the vertical and horizontal overscan portions of an NTSC TV signal.

B. Discussion of Prior Art

The active video portion of one horizontal line of an NTSC TV signal is approximately 52 μs while the active video portion in the vertical direction is approximately 12 ms. However, a typical NTSC TV receiver overscans, in both the horizontal and vertical direction, the transmitted image by approximately 6%, 3% on either side of the picture. This overscan causes the right and left edge, as well as the top and bottom, of the picture to remain hidden from view. The overscan interval amounts to approximately 1.5 μs of the active period on either side of the signal line and approximately 730 μs of the active period on the top and bottom.

This unseen portion of the NTSC signal provides an opportunity to transmit other information during the horizontal and vertical overscan portion of the signal. To date, designers of wide-screen TV receivers have used the horizontal overscan portion to transmit side panel information which, along with the center panel information, is converted into a wide-screen TV image.

An example of the above use of the overscan portion of the NTSC TV signal is found in (1) Inoue et al., "Encoding and Decoding in the 6-MHz NTSC-Compatible Widescreen Television System", *IEEE Transactions on Circuits and Systems for Video Technology*, Vol. 1, No. 1, Mar. 1991, pp. 49–58.

Other examples are found in U.S. Pat. No. 4,552,754 issued to Meise et al. and U.S. Pat. No. 4,888,641 issued to Isnardi et al. both of which are hereby incorporated by reference for their teachings on the design of television systems. In Meise et al., the side panel information for the wide-screen image is time compressed for transmission during the horizontal overscan (see col 3, lines 48 to 64). And, in Isnardi et al., an auxiliary channel is used for transmitting auxiliary video information to be used with a widescreen HDTV system (see cols 4–5 with reference to FIG. 1 and see FIG. 3a).

However, the overscan portion of the NTSC TV signal need not be limited to transmission of side panel information for wide-screen receivers. This transmission time period can be used to transmit many different types of information, whether digital or analog, for many different purposes.

SUMMARY OF THE INVENTION

One aspect of the present invention is a system for encoding digital data within the horizontal overscan portion of a baseband video signal including control circuitry which generates a control signal that is active during the horizontal overscan portion of said video signal and inactive otherwise. The system also includes circuitry which generates a first carrier signal with a frequency within the band of frequencies occupied by said baseband video signal. Digital data is supplied to the system by a digital data source at a predetermined rate. The system includes a modulator which modulates the first carrier signal with the digital data using quadrature amplitude modulation (QAM) at times indicated by the control signal.

In another aspect of the present invention, the modulator includes a QAM encoder that encodes a group of five consecutive bits received from the digital data source by generating a first signal on an I channel and a second signal on a Q channel. The first and second signals have amplitude levels corresponding to the five consecutive bits. First and second pulse shaping circuitry shapes the first and second signals generated by the encoder. A phase shifter generates a second carrier signal which is shifted in phase by 90° with respect to the first carrier signal. A first multiplier multiplies the shaped first signal with the first carrier signal to produce a first output signal and a second multiplier multiplies the shaped second signal with the second carrier signal to produce a second output signal. These signals are additively combined to generate the modulated output signal

BRIEF DESCRIPTION OF THE DRAWINGS

The invention is best understood from the following detailed description when read in connection with the accompanying drawings, in which:

FIGS. 11A and 11B show the exemplary frequency response of a square-root raised cosine filter and a table of the plotted data points, respectively.

DETAILED DESCRIPTION OF THE INVENTION

A. Overview

Figure 1:
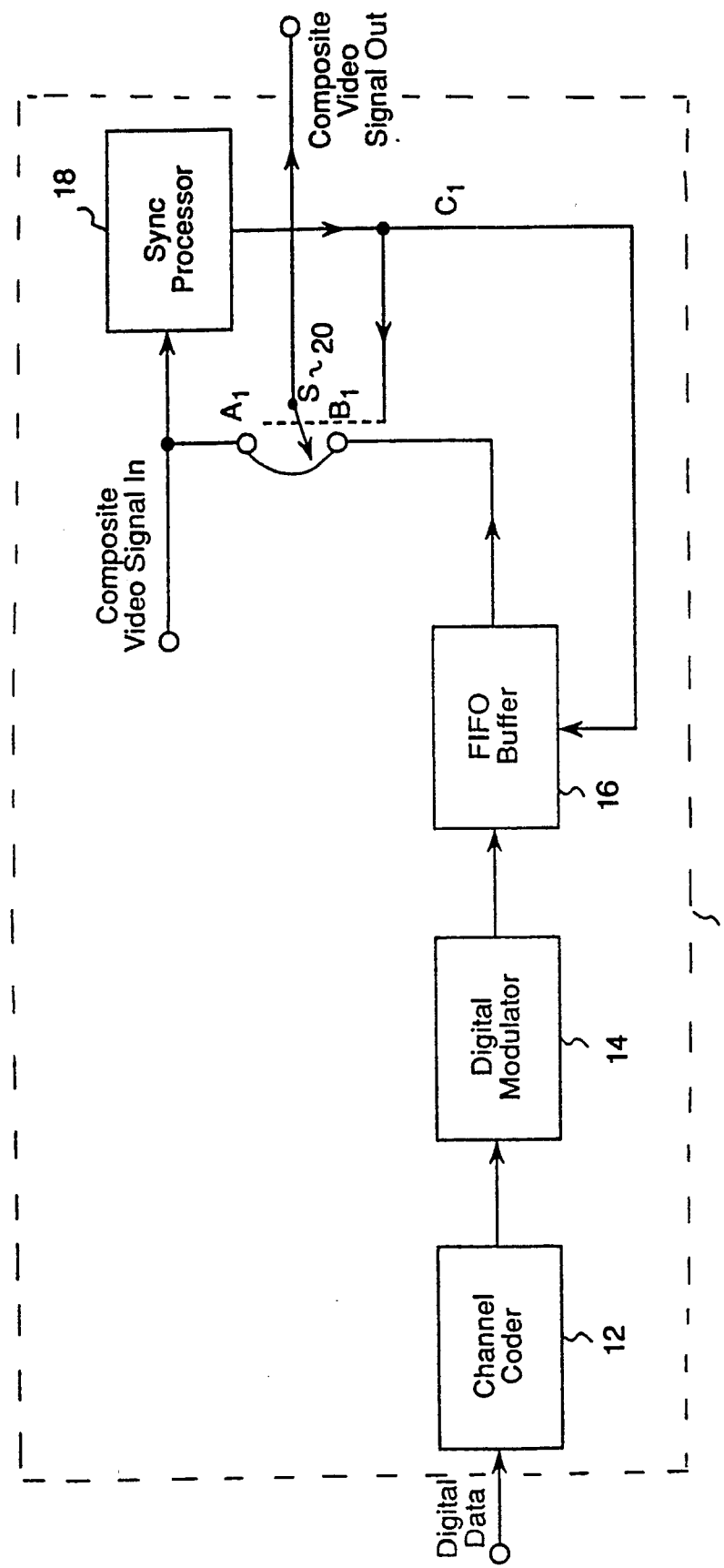
FIG. 1 shows a high level functional block diagram of an encoder suitable for use with the present invention.

FIG. 1 shows a high level functional block diagram of an encoder 10 suitable for use with the present invention.

As shown, digital data is provided to channel coder 12 which performs forward error correction coding. Channel coder 12 adds redundant bits and makes other modifications to make the data robust and more resistant to channel impairments such as noise, multipath distortion, etc.

The output of channel coder 12 is then applied to digital modulator 14. Modulator 14, using quadrature amplitude modulation (QAM) techniques, modulates first and second quadrature-phase-related carrier signals with the data provided by channel encoder 12 such that it fits within the video bandwidth of dc-4.2 MHz as well as satisfies the amplitude level restrictions normally imposed on active video information (luminance and chrominance). The particulars of modulator 14 are described below with reference to FIGS. 4, 5 and 6.

It should be noted that QAM techniques are well known by those skilled in the art. A description of QAM techniques is found in Schwartz, *Information Transmission, Modulation and Noise*, McGraw Hill series in Electrical Engineering, copyright 1980, Section 4-3, p. 224 et seq. which is herein incorporated by reference.

The output of digital modulator 14 is applied to first-in first-out (FIFO) buffer 16. FIFO 16 is used so that the digital data may be received at a defined rate, encoded and then transmitted in bursts corresponding to the horizontal and vertical overscan regions.

Figure 2:
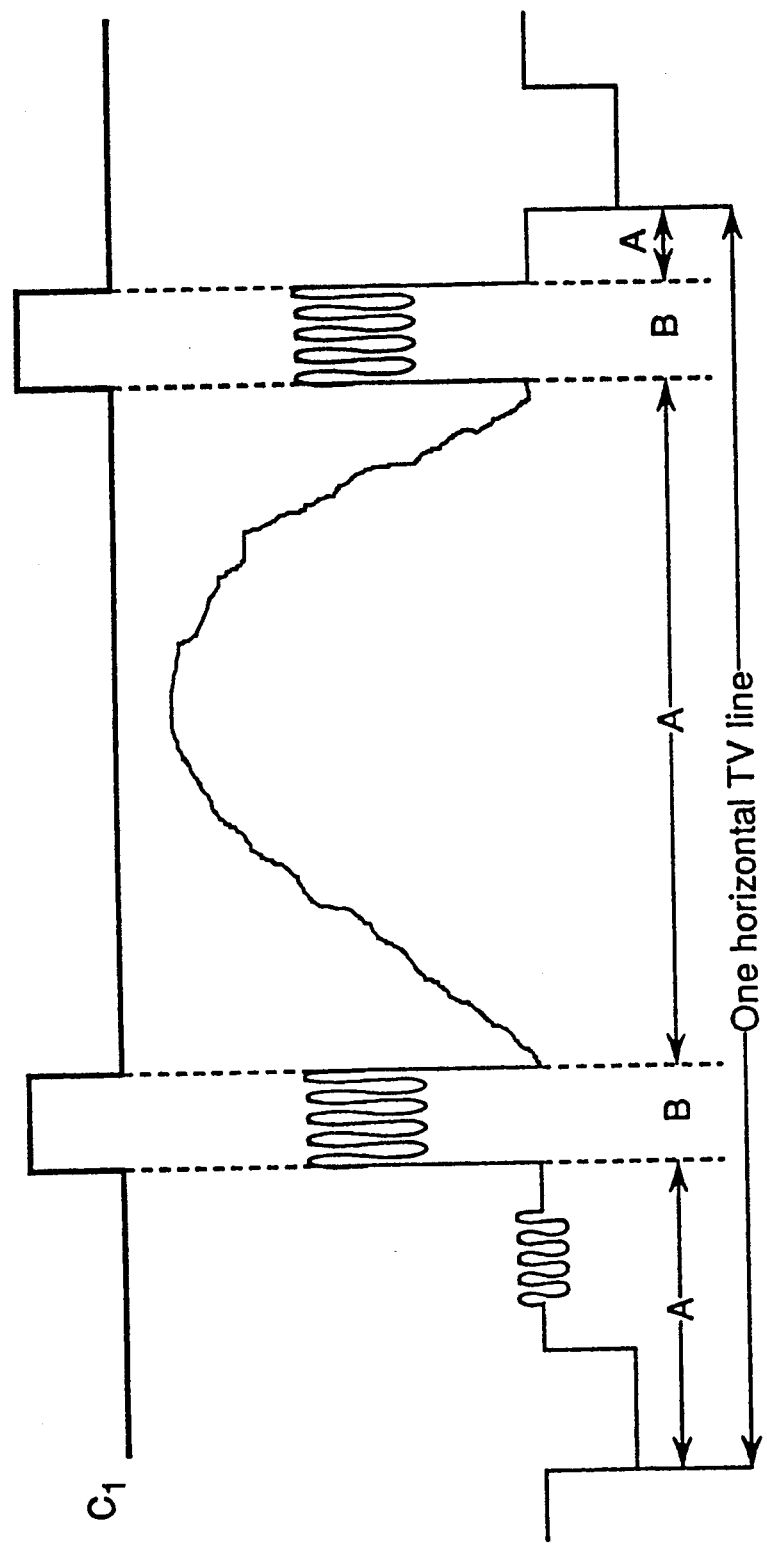
FIG. 2 shows a control signal which is used in the encoder shown in FIG. 1 to define the overscan portion of a TV signal.

Also shown in FIG. 1 is sync processor 18. Processor 18 accepts a composite video signal as its input signal and generates a control signal, C1. C1, as illustrated in FIG. 2, is active high during the horizontal overscan portion of the NTSC TV signal, and low during the non-overscan portion of the TV signal. The details of sync processor 18 are described below with reference to FIG. 8.

Referring to FIGS. 1 and 2, signal C1 controls the position of switch 20 and the flow of modulated digital data from FIFO 16. When C1 is in a logic high state, switch 20 is positioned at $B_1$ and the source of transmitted data during the overscan portion is FIFO 16. When C1 is logic low, switch 20 is positioned at $A_1$ and the source of transmitted data during the non-overscan portion is the video signal.

Referring to FIG. 2, the active period of the video signal, which extends from the beginning of the first period labeled "B" to the end of the second period labeled "B", occupies 754 pixel locations. The two periods labeled "B" in FIG. 2 occupy 20 pixel locations each: from 1 to 20 and from 735 to 754. However, the present invention, as described below with reference to FIG. 4, transmits symbols rather than pixel information during these periods. Each symbol requires approximately five pixel locations, thus, at least four complete symbols are transmitted during these periods. The first and fourth of these symbols are dummy symbols, only the second and third symbols are valid.

Dummy symbols are added due to two transitions which can cause problems. The first transition is from pixel 0 (the last pixel of the horizontal blanking interval) to pixel 1 (the first pixel of the modulated digital data signal). The second transition is from pixel 20 (the last pixel of the modulated digital data signal) to pixel 21 (the first pixel of displayed active video). It should be noted that the same problems can arise at the transitions from pixel 733 to 734 and pixel 754 to 754.

When the composite video signal passes through a 4.2 MHz bandlimiting low pass filter to fit the signal within the assigned video bandwidth, these transitions may suffer over/under shoot, and ringing thereby corrupting a few pixels near the boundaries of the overscan region. By sending dummy symbols (5 pixels) near the boundaries, we ensure that the inner two symbols of each group of four symbols suffer no distortion since the ringing should have been greatly reduced at those inner pixels.

In the exemplary embodiment of the present invention, the two dummy symbol are identical to each of the valid symbols This is readily accomplished in the 32 QAM encoder by repeating each mapped symbol twice. For example, if the valid symbols are A and B, then the four symbols are A,A,B,B.

While, in the embodiment of the invention described below, symbols are repeated during both the horizontal and vertical overscan intervals, symbols may be sent with less repetition in the vertical scan interval. It is contemplated that each horizontal line of samples in the vertical overscan region may have only the first and last pixels in the line repeated.

Once the encoded composite video signal is modulated and transmitted, it is received and demodulated by a conventional television receiver (not shown) to produce a composite video signal.

Figure 3:
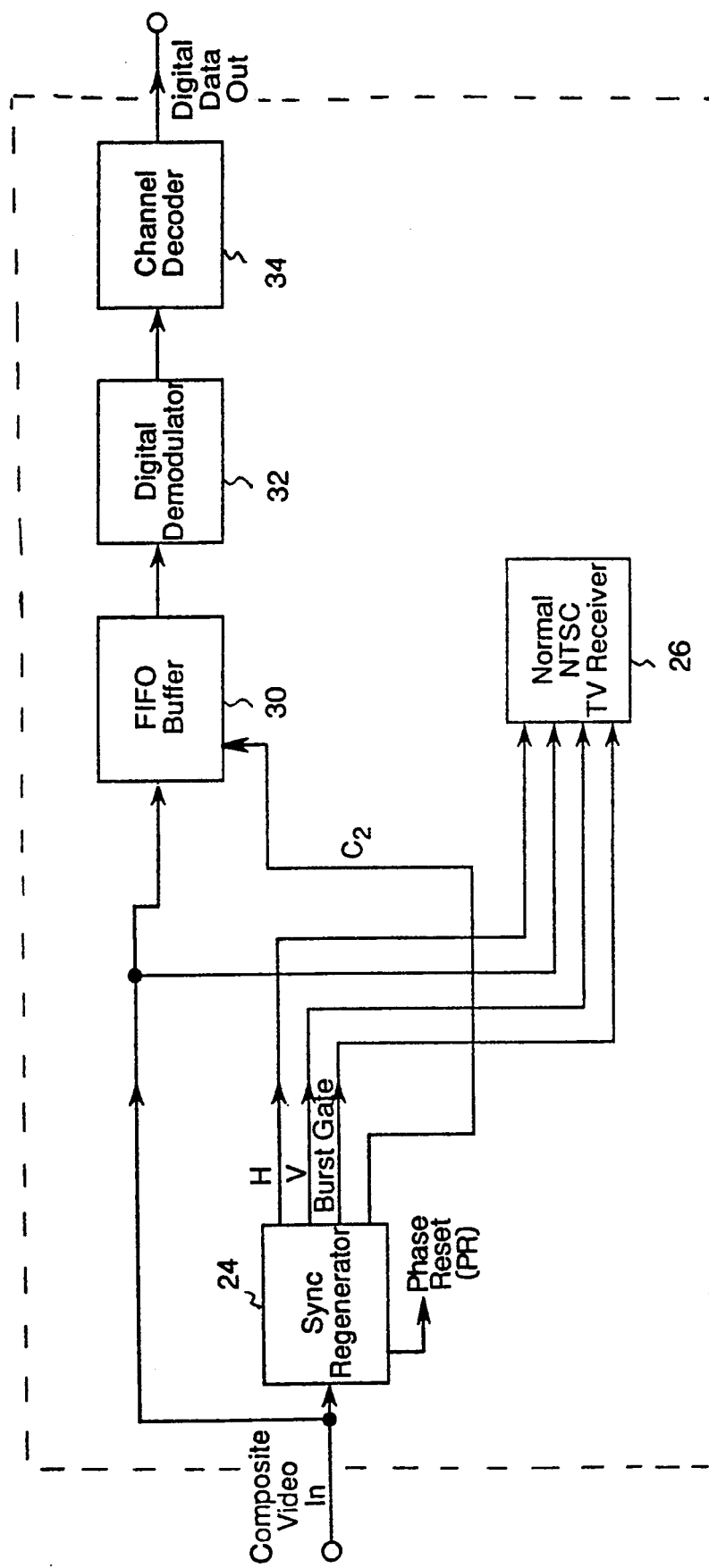
FIG. 3 shows a high level functional block diagram of a decoder which receives and decodes the signal transmitted by the transmitter shown in FIG. 1.

FIG. 3 shows a high level functional block diagram of decoder 22 of a television receiver suitable for use with the present invention. The composite video output signal of encoder 10 is now the composite video input signal for decoder 22.

The NTSC composite video signal is applied to sync regenerator 24. Regenerator 24 regenerates horizontal sync (H) and vertical sync (V) signals along with a burst gate (Burst Gate) signal which are sent to NTSC receiver 26 for conventional receiver processing. The use of the H, V and Burst Gate in conventional receiver processing is well known by those skilled in the art; however, these signals are also used in regenerator 24 for timing purposes which is described below with reference to FIG. 9.

Figure 9:
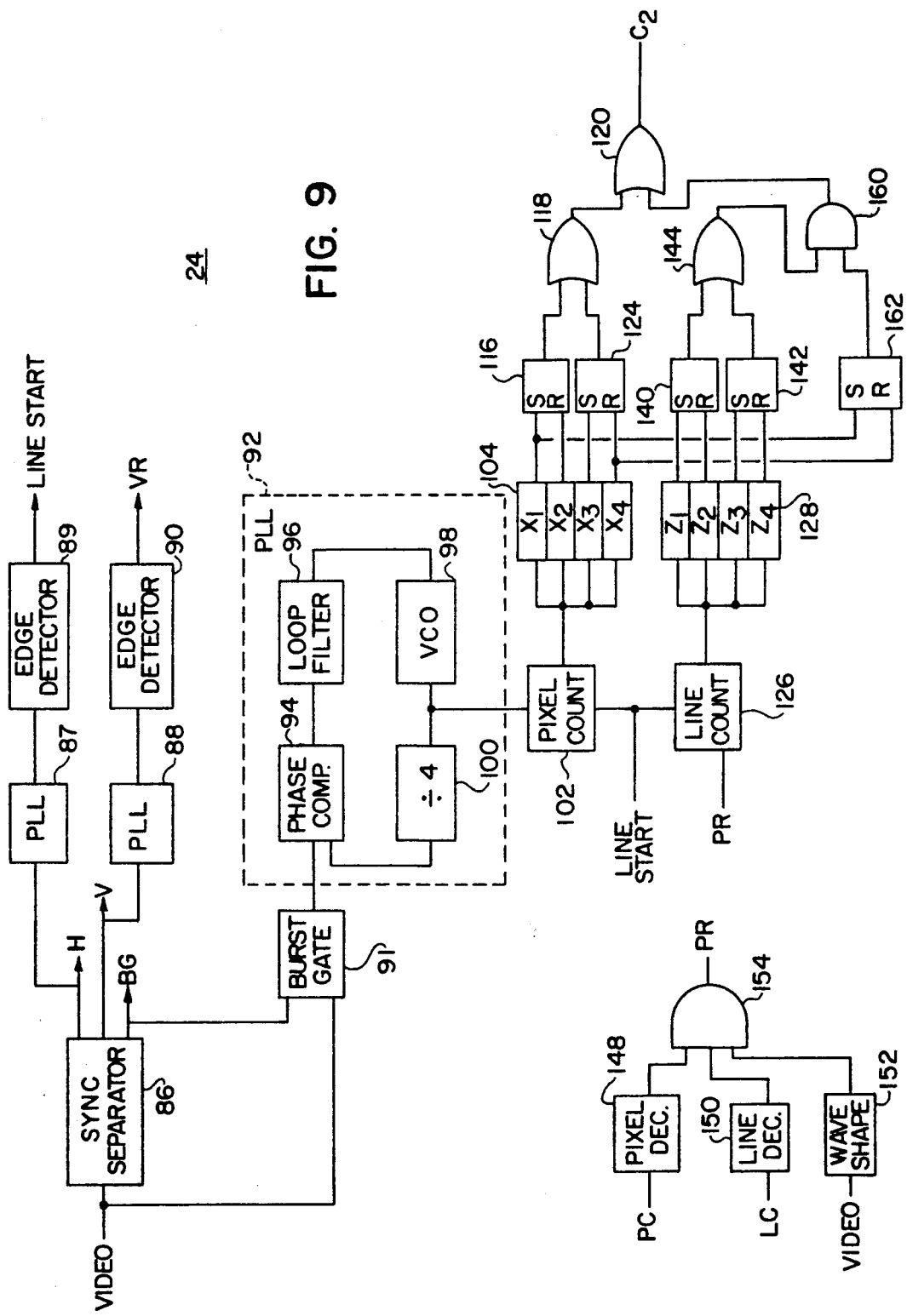
FIG. 9 shows a functional block diagram of the sync regenerator shown in FIG. 3.

Briefly, in FIG. 9, regenerator 24 generates control signal C2 (which is a reconstructed version of signal C1) using H, V and Burst Gate. Referring to FIG. 3, control signal C2 is then used to control the writing of the appropriate portion of the composite video signal to FIFO buffer 30.

Once the modulated digital data is extracted from the composite video signal and stored in FIFO 30, it is read out at a defined rate and input to digital demodulator 32. Demodulator 32 appropriately demodulates the data, discards the dummy symbols and passes it along to channel decoder 34. The particulars of demodulator 32 are described below with reference to FIG. 6.

Finally, channel decoder 34 detects and corrects errors in the data which occurred during transmission and outputs the corrected digital data.

B. Detailed Description of the Exemplary Embodiment

1. Encoder 10 a. Channel Coder 12

Figure 4:
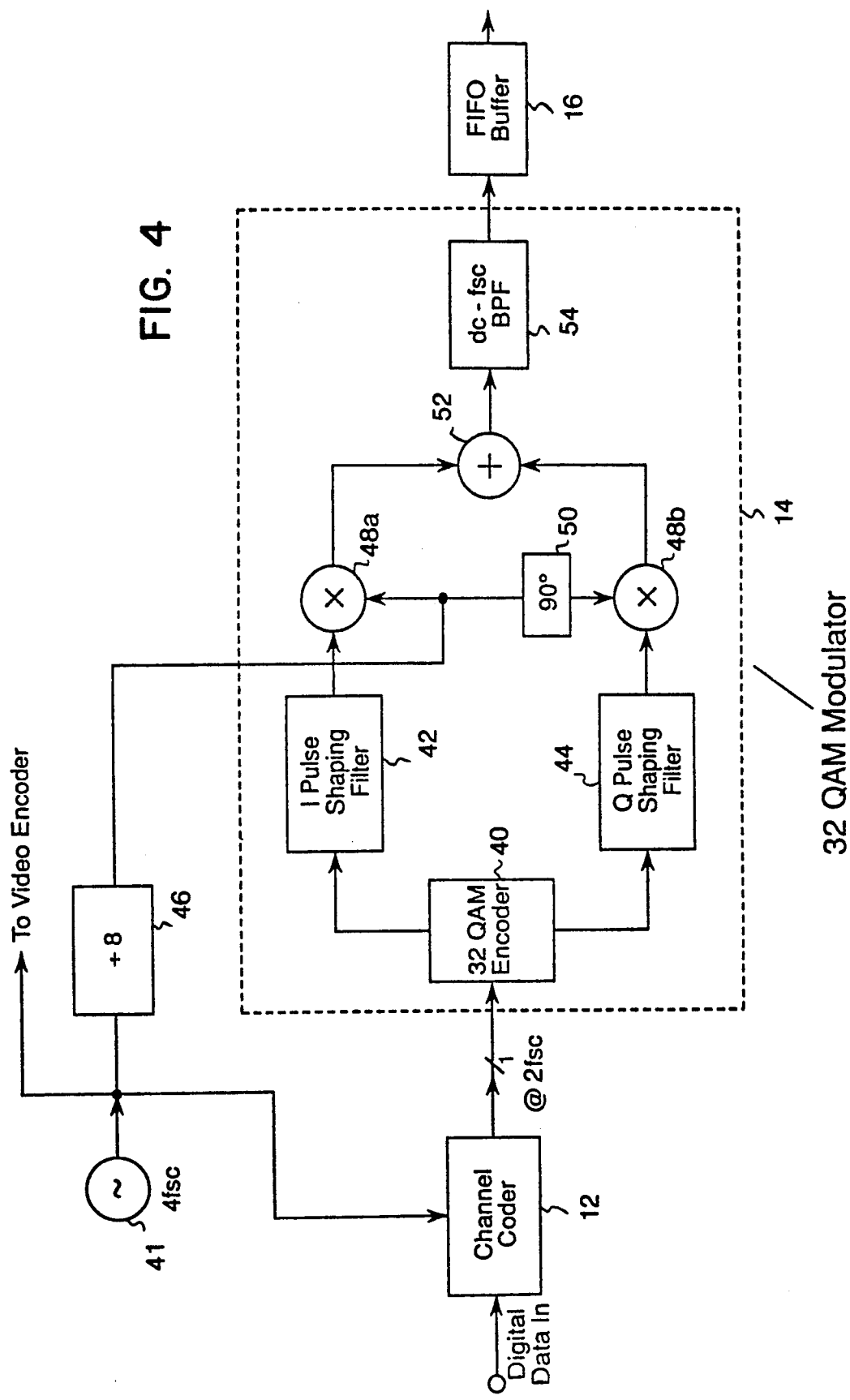
FIG. 4 shows a functional block diagram of the modulator used by the encoder shown in FIG. 1.

As shown in FIG. 4, digital data enters channel coder 12 which performs forward error correction. The techniques employed in channel coder 12 are well known to those skilled in the art. And, as is understood by those skilled in the art, different types of forward error correction techniques could be substituted for those in the exemplary embodiment of the present invention with similar overall results.

In the exemplary embodiment of the present invention, channel coder 12 may include a concatenated system with an inner convolutional coder to combat random noise and an outer block code to combat impulsive or bursty noise either picked up in the channel during transmission or introduced due to errors caused by the convolutional decoder. For instance, a rate 145/155 Reed Solomon block code can be concatenated with a rate 4/5 Trellis code.

The digital data, one bit at a time, then exits channel coder 12 at a rate of $2f_{sc}$ (where $f_{sc}$ is the frequency of the color subcarrier, in the exemplary embodiment of the invention, $f_{sc}$ is 3.579545 MHz). In many TV receivers, the color subcarrier or a multiple of it is regenerated from the video signal. In many systems a frequency of $4f_{sc}$ is advantageous for modulating and demodulating color signals.

b. Digital Modulator 14

Modulator 14 is a 32-level quadrature amplitude modulator (QAM). The data exiting channel coder 12 at the $2f_{sc}$ rate enters modulator 14 at the same rate.

The particulars of modulator 14 are shown in detail within the dashed-line box of FIG. 4.

First, as mentioned above, the digital data enters the 32-state QAM encoder 40 at a rate of $2f_{sc}$. QAM encoder 40 maps successive groups of five consecutive bits received from channel coder 12 into respective symbols. These symbols are represented by two amplitude levels generated by QAM encoder 40: one is provided to the I channel and one is provided to the Q channel. In the present invention, there are six possible levels for each channel, therefore, there are thirty six possible combinations of which only thirty two are used.

Figure 5:
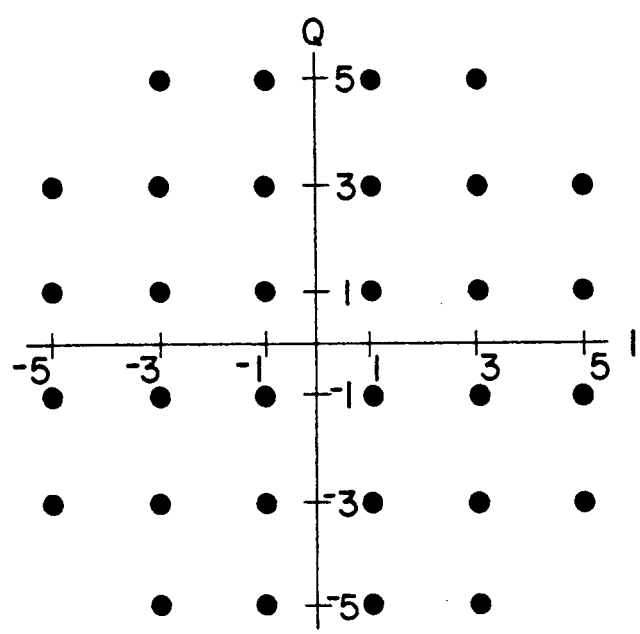
FIG. 5 shows a 32-state QAM constellation for the QAM encoder shown in FIG. 4.

To further illustrate this mapping technique, FIG. 5 shows a signal constellation for a 32-state QAM encoder. For any given state in the constellation, represented by the dots, there is a corresponding level along each of the I and Q axis of the graph. Thus, QAM encoder 40 receives five bits and, based on the correspondence between that value and the defined points in the constellation, outputs the appropriate amplitude level signals in both the I and Q channels. Furthermore, it repeats each symbol, thereby adding dummy symbols into the stream of symbols for the reasons described above. This translates into a symbol clock rate for QAM encoder 40 of $4f_{sc}/5$ (digital data enters at $2f_{sc}$ with a new amplitude level for both the I and Q channels generated every 5 bits: $2f_{sc}/5$; then each symbol is repeated giving a total symbol rate of $4f_{sc}/5$).

As QAM encoder 40 generates the signals with appropriate amplitude levels for the I and Q channels, they are sent through their respective pulse shaping circuits: I pulse shape filter 42 shapes the pulse for the I channel and Q pulse shape filter 44 shapes the pulse for the Q channel. Filters 42 and 44 are square-root raised cosine filters.

Figure 6:
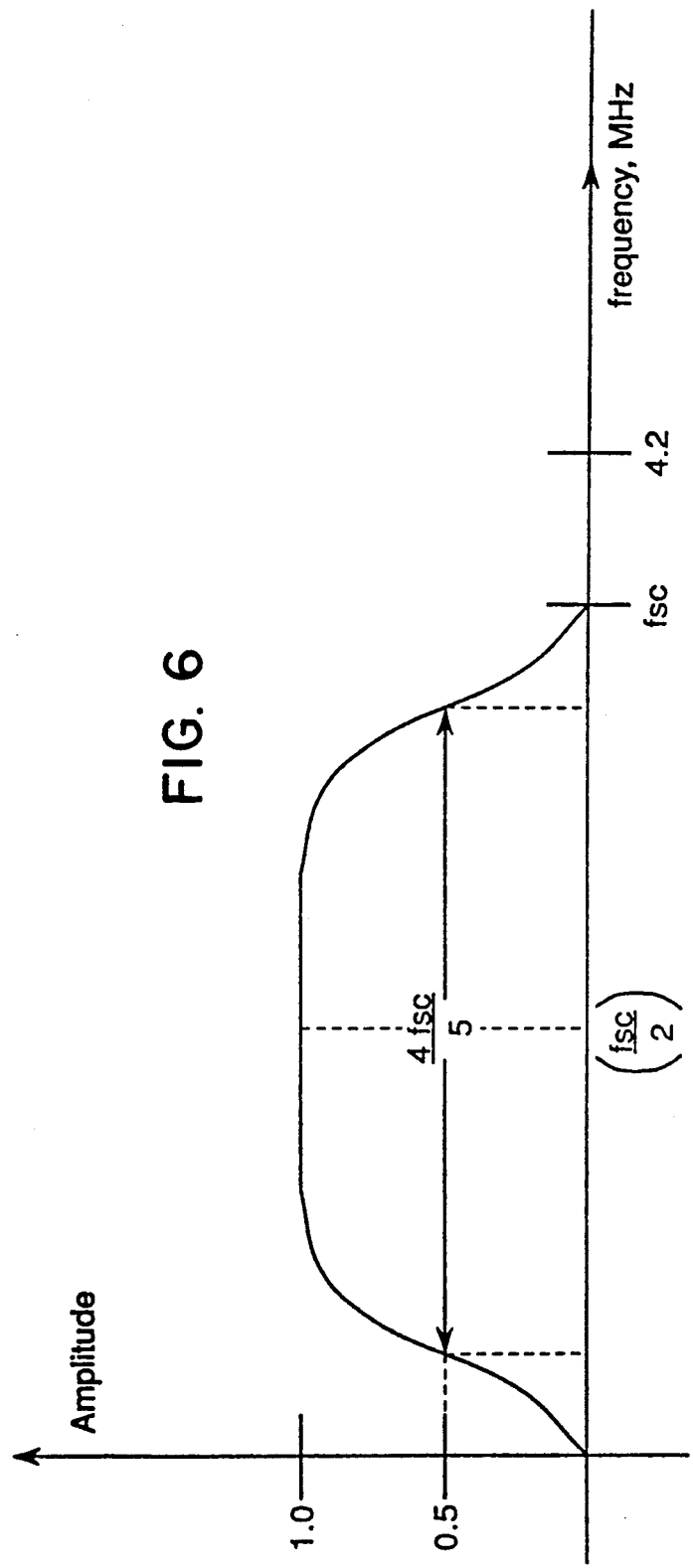
FIG. 6 shows an exemplary frequency spectrum for the quadrature amplitude modulation carrier signal used in the encoder and decoder of FIGS. 1 and 3.

FIG. 6 shows the frequency spectrum which may be occupied by the QAM signals including the transmission bandwidth of $4f_{sc}/5$ centered at a carrier signal frequency of $f_{sc}/2$ and defined as being shaped by a raised cosine filter. It should be noted that the choice of $4f_{sc}/5$ as the QAM symbol clock rate allows for a conservative cosine roll off factor of 25%. Moreover, as mentioned above, it results in the bit clock rate conveniently being $2f_{sc}$, after allowing for the dummy symbols.

Figure 11A:
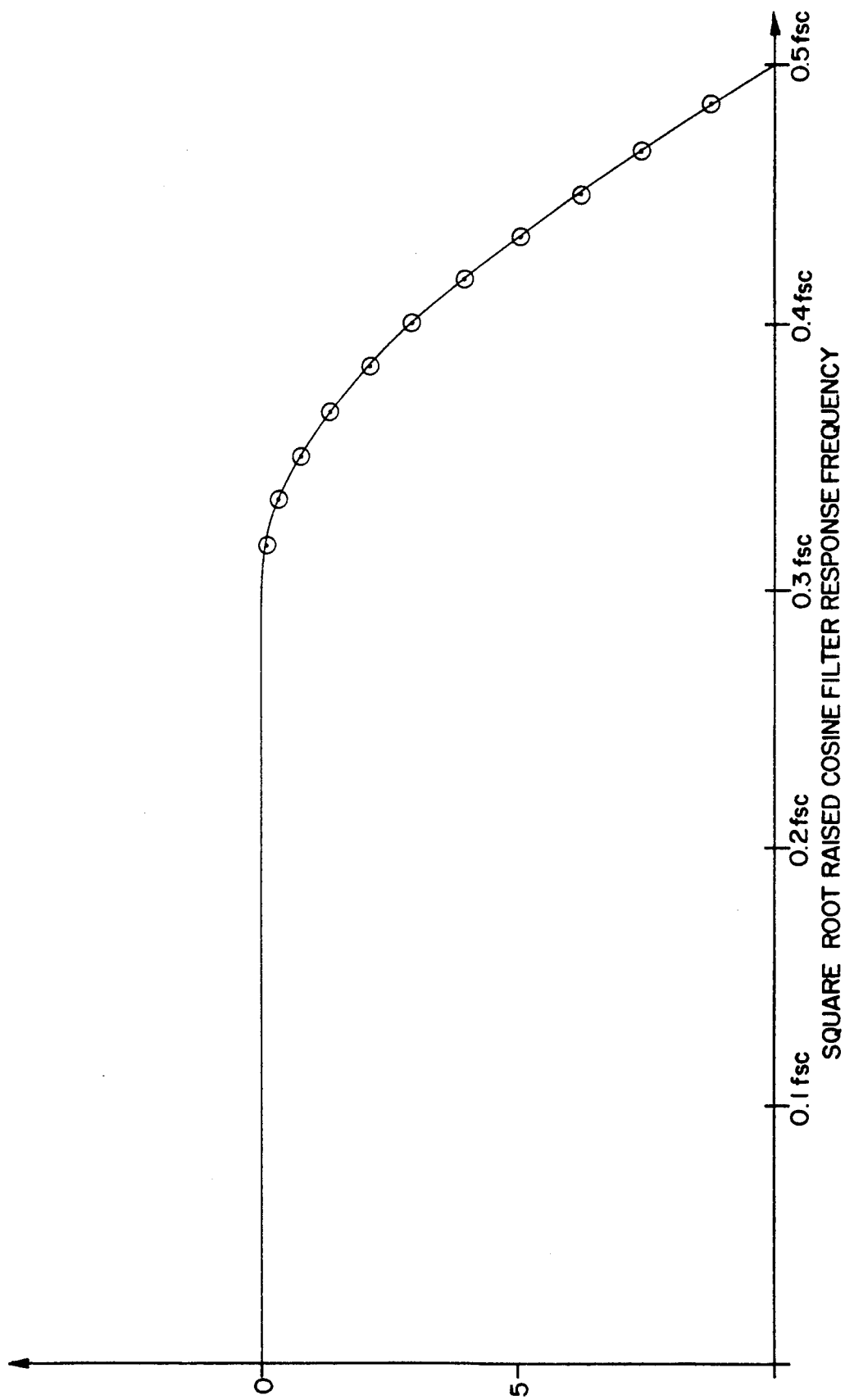

At this point, it should be noted that similar filtering, using a square-root raised cosine filter, is performed in decoder 22, as described below with reference to FIG. 7. FIGS. 11A and 11B show the frequency response of a square-root raised cosine filter and a table of plotted data points, respectively. The series combination of the two square-root raised cosine filters for each channel (one in encoder 10 and one in decoder 22) results in an overall shaping of the bandwidth equivalent to a raised cosine filter with a 25% roll off factor.

It should be noted that using raised cosine filtering is well known to those skilled in the art. The overall shaping of the bandwidth as a result of the raised cosine filter is seen in FIG. 6.

Once shaped, the pulses are ready to modulate their respective carrier signals In the exemplary embodiment, the carrier signals each have a frequency of $f_{sc}/2$ which is created by dividing the $4f_{sc}$ clock by 8, as represented by divider 46 in FIG. 4.

It should be noted that it is useful to use as much of the conventional 4.2 MHz video bandwidth as possible for the modulated signal. Thus, the choice of the carrier signal frequency of $f_{sc}/2$ allows the use of the band from dc to $f_{sc}$ for the 32-level QAM signal.

Next, the pulses output from filters 42 and 44 modulate their respective carrier signals, as represented by multipliers 48a and 48b: the signal in the I channel modulates an in-phase carrier signal while the signal in the Q channel modulates a quadrature-phase carrier signal (90° phase shift, as represented by functional block 50).

After each pulse has modulated its respective carrier signal, the signals from the I and Q channels are added, as represented by adder 52. The combined signal then passes through bandpass filter 54 which substantially removes frequency components not within the range defined by dc-$f_{sc}$. The filtered, modulated data is then sent to FIFO 16.

c. FIFO 16

As shown in FIG. 4, the data output from modulator 14 is sent to FIFO 16. FIFO 16 has independent control inputs (not shown) for reading and writing data. As mentioned above, control signal C1 generated by sync processor 18 controls the reading of data out of FIFO 16.

FIFO 16 could be designed, using dual-port RAMs, to simultaneously read and write. Thus, writing to FIFO 16 could be done at a defined rate while the reading out of data would be controlled by C1.

It should be noted that the design of FIFO 16 is well known to those skilled in the art. And, as is understood by those skilled in the art, a substitute capable of storing the modulated data and responding to control signals for dictating the flow of data in and out of storage would suffice.

d. Sync Processor 18

Although not shown in FIG. 4, sync processor 18 (see FIG. 1) derives control signal C1 from the horizontal sync (H) and vertical sync (V) signals and the bit clock.

Figure 8:
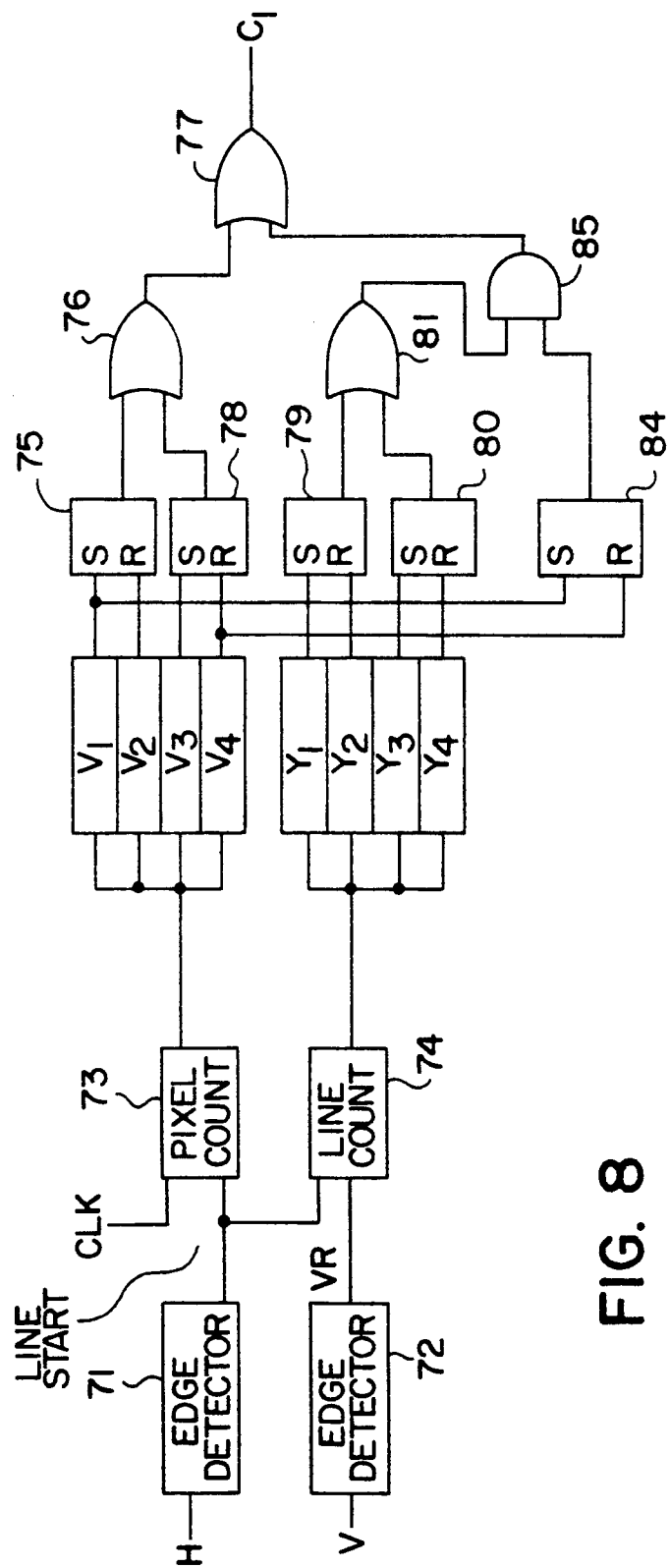
FIG. 8 shows a functional block diagram of the sync processor shown in FIG. 1.

FIG. 8 shows a functional block diagram of sync processor 18. H and V, which are both available in encoder 10, are input to respective edge detectors 71 and 72.

Edge detector 71, upon detecting the edge of H, generates a signal, LINE START, indicating the start of a new line. Likewise, edge detector 72, upon detecting the edge of V, generates a signal, VR (vertical reset) indicating the start of a new field. LINE START and VR reset pixel counter 73 and line counter 74, respectively.

CLK, which has a frequency of $4f_{sc}$, drives pixel counter 73 which applies its output to four decoders, V1-V4. The output of decoders, V1-V4, combine to generate the leading and falling edges for control signal C1 indicating the presence of the left and right side of the horizontal overscan portion of the video signal.

When pixel counter 73 reaches a predetermined count value, decoder V1 outputs a logical high signal setting SR flip-flop 75. This signal indicates that the left side of the horizontal overscan portion of the video signal has begun, when SR 75 is set, it in turn generates the leading edge of C1 by way of OR gates 76 and 77. Subsequently, when pixel counter 73 reaches a second predetermined count, decoder V2 outputs a logical high signal resetting SR 75. This signal indicates that the left side of the horizontal portion of the video signal has ended, when SR 75 is reset, it in turn generates the falling edge of C1 by way of OR gates 76 and 77.

The above description is the same when C1 is generated for the right side of the horizontal overscan except decoders V3 and V4, along with SR 78, generate the leading and falling edges of C1.

In addition, the above description is the same when C1 is generated for the top and bottom portions of the vertical overscan except decoders Y1–Y4, along with SR flip-flops 79, 80 and OR gate 81, generate the necessary leading and falling edges of C1. However, because the horizontal blanking interval for each line of information must be preserved, the output of OR gate 81 is ANDed (AND gate 85) with the output of SR flip-flop 84 before reaching OR gate 77. This ensures that C1 is only logic high during the vertical overscan from the period beginning with the pixel count value in decoder V1 and ending with the pixel count value in decoder V4.

Also, as mentioned above, for determining the horizontal overscan, LINE START is used to reset pixel counter 73, whereas, for determining the vertical overscan, LINE START is the clock signal input to line counter 74 while VR does the resetting.

e. Switch 20

Also not shown in FIG. 4 is switch 20 of FIG. 1. Switch 20, responsive to its control input signal, selects between two input signals. This function is easily realized using a multiplexer where the two signal inputs are the video signal and the modulated digital data and the control signal is C1.

The actual design of switch 20 is well known by those skilled in the art. And, as is understood by those skilled in the art, the function of switch 20 is to allow either the NTSC TV signal or the modulated digital data to be transmitted at any given instant of time based on its control signal input. Obviously, switch 20 should be capable of handling the signals it will pass as well as being responsive to the control signal. Thus, most any substitute capable of performing the above function would suffice for the present invention.

2. Decoder 22 a. Sync Regenerator 24

As shown in FIG. 3, sync regenerator 24 derives control signal C2 and PR from the received video input signal.

FIG. 9 shows a functional block diagram of sync regenerator 24. The video signal is input to a conventional sync separator 86. Separator 86 generates the signals H, V and BG which are used both by the conventional receiver circuit (not shown) and the circuit for identifying the horizontal and vertical overscan portions of the video signal.

The horizontal synchronization signal H is applied to PLL 87 which acts as a narrow band-pass filter to generate a horizontal synchronization signal which is substantially free of noise. The output of PLL 87 is applied to edge detector 89 which, upon detecting the edge of H, generates a signal, LINE START, indicating the start of a new line. Likewise, the vertical synchronization signal, V, is applied to PLL 88 which applies its output to edge detector 90 which, upon detecting the edge of a pulse of the filtered output signal, generates a signal, VR (vertical reset), indicating the start of a new field.

The burst gate signal, BG, along with the video input signal, is applied to burst gate 91 which provides the reference input signal to PLL 92. PLL 92 comprises a phase comparator 94, a loop filter 96, a 4fsc voltage controlled oscillator (VCO) 98 and a frequency divide-by-4 circuit 100.

The output of PLL 92 drives pixel counter 102 which applies its output to four decoders, X1–X4. The output of decoders, X1–X4, combine to generate the leading and falling edges for C2 indicating the left and right side of the horizontal overscan portions of the video signal.

When pixel counter 102 reaches a predetermined count, decoder X1 outputs a logical high signal setting SR flip-flop 116. Because this indicates that the left side of the horizontal overscan portion of the video signal has begun, when SR 116 is set, it in turn generates the leading edge of C2 by way of OR gate 118 and OR gate 120. Subsequently, when pixel counter 102 reaches a second predetermined count, decoder X2 outputs a logical high thus resetting SR 116. Because this indicates that the left side of the horizontal portion of the video signal has ended, when SR 116 is reset, it in turn generates the falling edge of C2 by way of OR gates 118 and 120.

The above description is the same when C2 is generated for the right side of the horizontal overscan except decoders X3 and X4, along with SR 124, generate the leading and falling edges of C2.

In addition, the above description is the same when C2 is generated for the top and bottom portions of the vertical overscan except decoders Z1–Z4, along with SR flip-flops 140 and 142 and OR gate 144, generate the necessary leading and falling edges of C2. However, as was the case in sync processor 18, because the horizontal blanking interval for each line of information is desirably preserved, the output of OR gate 144 is ANDed (AND gate 160) with the output of SR 162 before reaching OR gate 120. This ensures that C2 is only logic high during the active video portion of the vertical overscan interval, that is to say, the period from the beginning pixel count value in decoder X1 to the end pixel count value in decoder X4.

Also, for the horizontal overscan LINE START is used to reset pixel counter 102, whereas, for the vertical overscan, LINE START is the clock signal input to line counter 126 and VR does the resetting.

Also shown in FIG. 9 is the generation of PR. PR is the phase reset signal needed to synchronize the phase of the regenerated symbol clock, $4f_{sc}/5$, with the original symbol clock used in QAM encoder 40 (see FIG. 4).

PR is generated by extracting phase information from the received video signal. The phase information is transmitted on a predetermined horizontal line during predetermined pixel locations. Therefore, decoders 148 and 150 decode the output of pixel counter 102 and line counter 126 such that, during a predetermined line and pixel location, the video signal being shaped by wave shaper 152 passes through AND gate 154. The PR signal is used as a reset for divider 68 (see FIG. 5) to put the reconstructed symbol clock in proper phase.

b. NTSC Receiver 26

Figure 7:
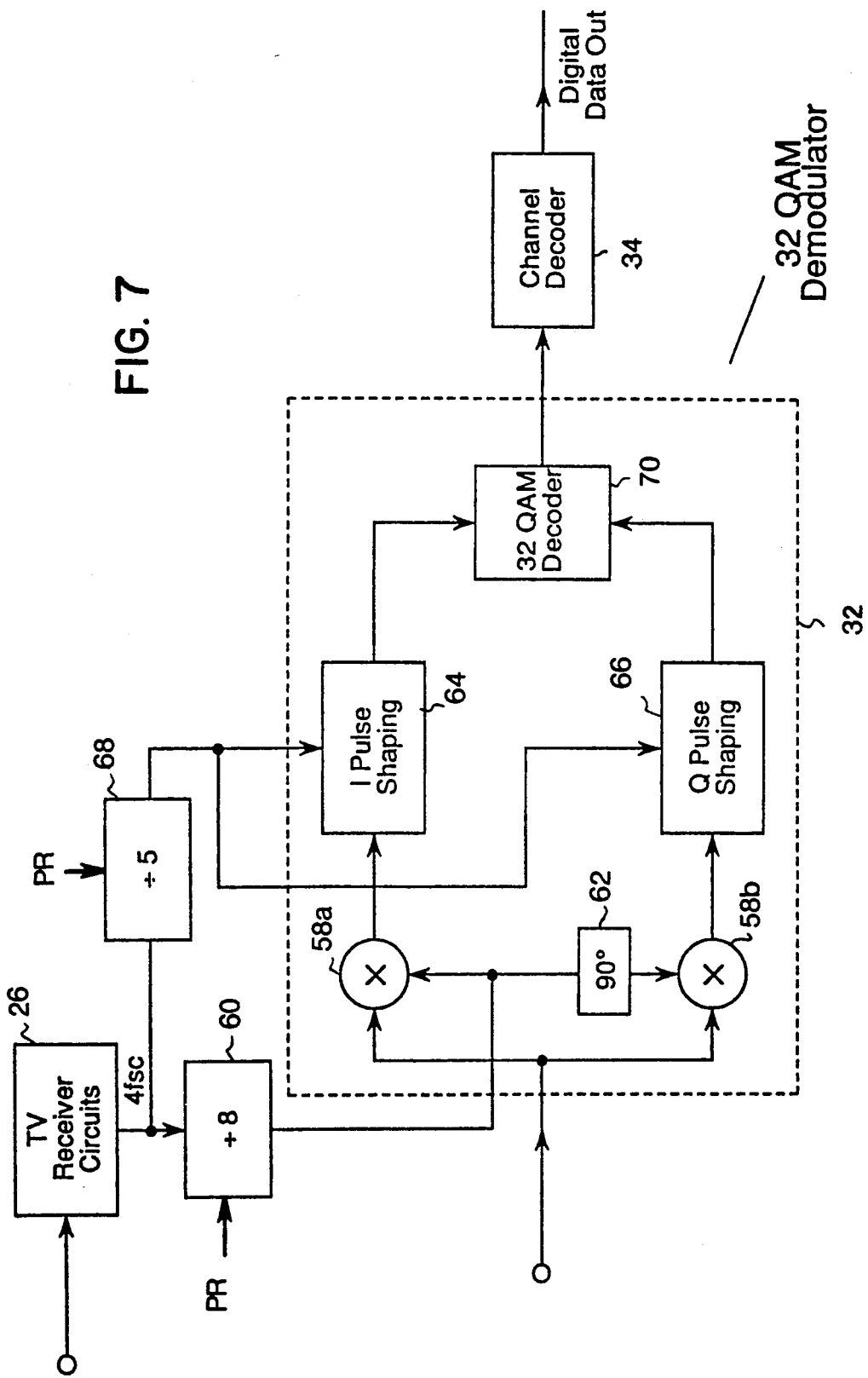
FIG. 7 shows a functional block diagram of the demodulator shown in FIG. 3.

Referring to FIG. 7, receiver 26 is well known to those skilled in the art. It is included in the description because, as mentioned above, the present invention takes advantage of the color subcarrier frequency available in most conventional receivers, thus, simplifying the design of decoder 22 (and, especially QAM decoder 70). Thus, receiver 26 not only accepts the information necessary to display the video signal but also provides a source of a signal with a frequency of $f_{sc}$ or $4f_{sc}$.

c. FIFO 30

Although not shown in FIG. 7, FIFO 30 receives the modulated digital data present in the overscan portion of the video signal. FIFO 30 has independent control inputs (not shown) for reading and writing data. As mentioned above, control signal C2 generated by regenerator 24 controls the writing to FIFO 30.

FIFO 30 could be designed, using dual-port RAMs, to simultaneously read and write, thus, reading from FIFO 30 could be done at a defined rate while the writing of data to FIFO 30 would be controlled by C2.

It should be noted that the design of FIFO 30 is well known to those skilled in the art. And, as is understood by those skilled in the art, any substitute capable of storing the modulated data and responding to control signals for dictating the flow of data in and out of storage would suffice.

d. Demodulator 32

As the modulated digital data is read out of FIFO 30, it is input to demodulator 32. Demodulator 32 is a 32-state QAM demodulator.

The particulars of demodulator 32 are shown in detail within the dotted lines of FIG. 7. First, the modulated digital data is separated from its quadrature carrier signals. To perform this separation in a QAM scheme, the modulated digital signal is multiplied by reconstructed versions of the carrier signals for each of the I and Q channels.

In this case, for the I channel, the modulated digital data is multiplied, using multiplier 58a, by a reconstructed in-phase carrier provided by a frequency divide by 8 circuit 60. Reconstructing the in-phase carrier requires that the signal not only have the same frequency as the original carrier but also be in phase with the original carrier with respect to the modulated symbols.

First, a signal with the same frequency as the original carrier, $f_{sc}/2$, is reconstructed from the color subcarrier or multiples thereof present in the NTSC receiver. This is indicated in FIG. 7 by the "÷8" functional block 60.

Second, the reconstructed carrier is put in phase with the original carrier by using the PR signal generated in sync regenerator 24. PR is applied to divider 60 as a reset such that the reconstructed carrier is put in phase with the original carrier signal. Thus, the signal PR generated at the transmitter synchronizes both the $f_{sc}/2$ signal and the $4f_{sc}/5$ signal.

As is known by those skilled in the art, the multiplication of the reconstructed in-phase carrier and the received signal results in the elimination of the in-phase carrier signal component.

Additionally, for the Q channel, the modulated digital data is multiplied by a reconstructed quadrature phase carrier, as represented by multiplier 58b. The quadrature phase carrier, having a frequency of $f_{sc}/2$ and being 90° out of phase relative to the in-phase carrier (performed by functional block 62), is reconstructed from the reconstructed in-phase carrier signal described above.

As is also known by those skilled in the art, the multiplication of the reconstructed quadrature phase carrier and the received signal results in the elimination of the quadrature phase carrier signal component.

After the carrier signals are eliminated, the recovered signals are shaped in their respective channels by I pulse shaper 64 and Q pulse shaper 66, respectively. As mentioned above, pulse shapers 64 and 66 use a square root raised cosine filter for shaping the recovered signals. In addition, pulse shapers 64 and 66 employ the symbol clock rate of $4f_{sc}/5$ in the shaping process, which has been reconstructed as represented by functional block 68.

The use of the $4f_{sc}/5$ symbol clock by pulse shapers 64 and 66 arises from the requirement that the sampling performed in QAM decoder 70 be precise in order to minimize inter-symbol interference.

The shaped pulses are then sent to the QAM decoder 70 which performs the opposite function of the QAM encoder 40. QAM decoder 70 receives the pulses from pulse shapers 64 and 66 and samples the amplitude levels for the signals received in the I and Q channels. Then, by way of reverse mapping (see FIG. 5), translates the amplitude levels for the I and Q channel signals into corresponding groups of five bit values. This sequence of five bits is sent, one bit at a time, to channel decoder 34, at a rate of $2f_{sc}$. Decoder 34 performs error detection and correction. It should be noted that the first and fourth symbols of any four-sample group are discarded because they are dummy symbols.

f. Channel Decoder 34

As shown in FIG. 6, digital data enters channel decoder 34 which performs error detection and correction. The error detection and correction techniques employed in channel decoder 34 are well known to those skilled in the art. And, as is understood by those skilled in the art, different types of error detection and correction techniques could be substituted for those in the exemplary embodiment of the present invention with similar overall results. Channel decoder 34 then outputs the demodulated digital data.

3. Additional Concerns

An additional concern of the present system is ghost cancellation. A ghost cancellation similar to the one described in U.S. Pat. No. 4,864,403 issued to Chao et al. which is hereby incorporated by reference for its teachings on automatic ghost cancellation can be combined with the present invention to greatly reduce multipath distortion.

Figure 10:
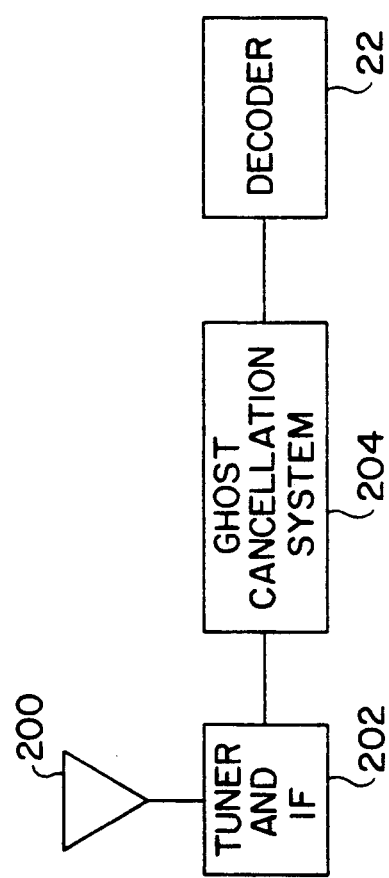
FIG. 10 shows a high-level block diagram of the present invention incorporating a ghost cancellation system.

FIG. 10 shows a ghost cancellation system according to Chao et al. incorporated with a high-level block diagram of the present invention. The transmitted signal is picked up by antenna 200, passed along to tuner/IF 202, processed by ghost cancellation system 204 and, finally, provided to decoder 22 of the present invention. Without ghost cancellation system 204, problems related to inter-symbol interference can arise and degrade the decoding ability of demodulator 32 (see FIG. 3).

Another additional concern of the present invention is intersymbol interference on band limited signals. Although the design of the modulating/demodulating scheme of the encoder/decoder configuration of the present invention has been described above, a detailed theoretical analysis by Proakis, *Digital Communications*, McGraw Hill copyright 1989 pp. 532-36 which is herein incorporated by reference provides additional theoretical support.

Although the invention is illustrated and described herein embodied as a system and method for encoding digital data, using QAM techniques, within the vertical and horizontal overscan portions of an NTSC TV signal, the invention is nevertheless not intended to be limited to the details as shown. Rather, various modifications may be made in the details within the scope and range of equivalents of the claims and without departing from the spirit of the invention.

What is claimed:

1. In a system for transmitting a video signal, wherein said video signal has a horizontal overscan portion, apparatus for transmitting digital data within the horizontal overscan portion comprising:
   a) control means for receiving the video signal and for generating a control signal which is active during the horizontal overscan portion of a horizontal line interval of said video signal and inactive otherwise;
   b) carrier generating means for generating in-phase and quadrature phase carrier signals having a frequency within the band of frequencies occupied by said video signal;
   c) supply means for supplying bit-serial digital data at a predetermined rate;
   d) encoding means, coupled to the supply means for converting the bit-serial digital data into symbols, wherein each symbol represents more than one bit of the digital data; and
   e) modulating means, connected to the encoding means and carrier generating means and responsive to the control signal, for modulating both the in-phase and quadrature phase carrier signals with each of the symbols using quadrature amplitude modulation (QAM) during the horizontal overscan portion of the video signal.

2. Apparatus according to claim 1 wherein the encoding means comprises:
   QAM encoder means, coupled to the supply means, for encoding a group of N consecutive bits received from the supply means as a respective one of $2^N$ points in a QAM constellation by generating a first signal on an I channel and a second signal on a Q channel, wherein each pair of said first and said second signals has a respective pair of amplitude levels corresponding to the N consecutive bits, where N is an integer greater than 1 and each of the groups of N consecutive bits is one symbol;
   first pulse shaping means, coupled to the QAM encoder means, for shaping the first signal generated by the encoder means;
   second pulse shaping means, coupled to the QAM encoder means, for shaping the second signal generated by the encoder means; and,
   wherein the modulating means includes:
   phase shifting means, coupled to the carrier generating means, for generating the quadrature carrier signal by shifting the phase of the in-phase carrier signal by 90°;
   first multiplying means, coupled to the first pulse shaping means and the carrier generating means, for multiplying the shaped first signal with the in-phase carrier signal to produce a first output signal;
   second multiplying means, coupled to the second pulse shaping means and the phase shifting means, for multiplying the shaped second signal with the quadrature carrier signal to produce a second output signal; and
   adding means, connected to the first and second multiplying means, for adding the first output signal and the second output signal.

3. Apparatus according to claim 2 wherein N equals 5.

4. Apparatus according to claim 3 wherein said video signal has a vertical overscan portion, the control means generates a control signal which is active during at least a portion of the vertical overscan portion, and the symbols derived from the bit-serial digital data modulate the in-phase and quadrature carrier signals during the portion of the vertical overscan portion of the video signal.

5. Apparatus according to claim 4 wherein each of said first and second signals has six potential amplitude levels, thereby creating thirty-six pairs of amplitude levels.

6. Apparatus according to claim 5 wherein the video signal has a color subcarrier signal having a frequency of $f_{sc}$, the QAM encoder means receives ones of the symbols at a rate of $4f_{sc}/5$, wherein the predetermined rate of the supply means is $2f_{sc}$ and the in-phase and quadrature carrier signals have a frequency of $f_{sc}/2$.

7. Apparatus according to claim 6 wherein the first and second pulse shaping means are filters each having a square-root raised cosine frequency response characteristic.

8. In a system for transmitting a video signal having a combination of digital data and video information, said system has a source of digital data, wherein said video signal has a color subcarrier signal with a frequency of $f_{sc}$ and said video signal has a horizontal overscan portion, a modulation system for modulating the digital data to be transmitted within the horizontal overscan portion, comprising:
   a) quadrature amplitude modulation (QAM) encoder means for encoding a group of N consecutive bits received rom the source as a respective one of $2^N$ points in a QAM constellation by generating a first signal on an I channel and a second signal on a Q channel, wherein said first and said second signals have successive amplitude levels corresponding to values of successive groups of the N consecutive bits, where N is an integer greater than 1;
   b) first pulse shaping means, coupled to the QAM encoder means, for shaping the first signal generated by the encoder means;
   c) second pulse shaping means, coupled to the QAM encoder means, for shaping the second signal generated by the encoder means;
   d) carrier generating means for generating a first carrier signal with a frequency of $f_{sc}/2$;
   e) phase shifting means for generating a second carrier signal which is shifted in phase by 90° with respect to the first carrier signal;
   f) first multiplying means, coupled to the first pulse shaping means and the carrier generating means, for multiplying the shaped first signal with the first carrier signal to produce a first output signal;
   g) second multiplying means, coupled to the second pulse shaping means and the phase shifting means, for multiplying the shaped second signal with the second carrier signal to produce a second output signal; and h) adding means, connected to the first and second multiplying means, for adding the first output signal and the second output signal.

9. A method suitable for use in a system having a source of digital data and apparatus which generates and transmits a video signal, wherein said video signal has a color subcarrier with a frequency of $f_{sc}$ and said video signal has an overscan portion, a method for modulating digital data within the overscan portion comprising the steps of
   a) encoding, during said overscan portion, a symbol composed of a group of N bits received from the source by generating as a respective one of $2^N$ points in a quadrature amplitude modulation (QAM) constellation a first signal on an I channel and a second signal no a Q channel, wherein said first and said second signals have respective amplitude levels which uniquely represent the symbol;
   b) shaping the first and second signals generated by the encoder means;
   c) generating a first carrier signal with a frequency F which is less than $f_{sc}$;
   d) generating a second carrier signal having the same frequency as the first carrier signal and being shifted in phase by 90° with respect to the first carrier signal;
   e) multiplying the shaped first signal with the first carrier signal to produce a first output signal;
   f) multiplying the shaped second signal with the second carrier signal to produce a second output signal; and
   g) adding the first output signal and the second output signal.

10. In a system for receiving a composite video signal, wherein said video signal contains modulated encoded digital data in its horizontal overscan portion, said data being encoded according to a quadrature amplitude modulation (QAM) encoding scheme in which the digital data is encoded as symbols which modulate two quadrature-phase related carrier signals having a frequency within a band of frequencies defied by the video signal, a system for decoding the digital data comprising:
   control means, which receives the video signal, for generating a control signal which is active during the horizontal overscan portion of a horizontal line interval of asid video signal and inactive otherwise;
   carrier reconstruction means for reconstructing the in-phase and quadrature phase carrier signals;
   extracting means, which receives the video signal and is coupled to the carrier reconstruction means, for extracting and decoding the modulated encoded digital data, wherein the extracting mans comprises:
      means, responsive to the control signal, for separating the modulated encoded data from the video signal;
      demodulation means for demodulating the modulated encoded data to produce an I channel signal representing the data values modulating the in-phase carrier signal and a Q channel signal representing the data values modulating the quadrature phase carrier signal;
      symbol clock reconstructing means for reconstructing a symbol clock having transitions which indicate instants at which symbols of the digital data occur in the I channel signal and in the O channel signal;
      first and second shaping means, coupled to the demodulation means, and symbol clock reconstruction means, for shaping the I channel signal and the Q channel signal, respectively to reduce interference between successive ones of said symbols; and
      QAM decoder means, coupled to the first and second shaping means, for decoding the shaped I and Q channel signals to recover the digital data symbols, wherein the combined amplitudes of the I and Q channel signals at instants determined by the symbol clock correspond to respective symbols, each symbol representing five bits of digital data.

11. In a system for receiving a video signal having a combination of video information and quadrature amplitude modulated (QAM) encoded digital data in which multi-bit digital data symbols modulate in-phase and quadrature phase carrier signals, wherein said video signal has a color subcarrier with a frequency of $f_{sc}$ and said video signal has a horizontal overscan portion, a demodulation system for demodulating the modulated encoded digital data received during the horizontal overscan portion, apparatus comprising:
   demodulation means or demodulating the modulated encoded data to produce an I channel signal representing information modulating the in-phase carrier signal and a Q channel signal representing information modulating the quadrature phase carrier signal;
   symbol clock reconstruction means for reconstructing a symbol clock having transitions which indicate instants at which symbols of the digital data occur in the I channel signal and in the Q channel signal;
   first and second shaping means, coupled to the demodulation means and the symbol clock reconstruction means, for shaping the I channel signal and the Q channel signal, respectively to reduce interference between successive ones of said symbols; and
   QAM decoder means, coupled to the first and second shaping means, for decoding the shaped I and Q channel signals to recover the digital data symbols, wherein the amplitudes of each pair of values of the shaped I and Q channel signals occurring at an instant determined by the symbol clock corresponds to a respective one of the symbols, each symbol representing five binary bits of digital data.

* * * * *